(12) United States Patent
Reh

(10) Patent No.: US 9,554,522 B2
(45) Date of Patent: Jan. 31, 2017

(54) HAND-OPERATED SHEARS

(75) Inventor: Bernhard Reh, Laichingen (DE)

(73) Assignee: HUSQVARNA AB, Huskvarna (SE)

( * ) Notice: Subject to any disclaimer, the term of this patent is extended or adjusted under 35 U.S.C. 154(b) by 1164 days.

(21) Appl. No.: 13/635,109

(22) PCT Filed: Mar. 25, 2010

(86) PCT No.: PCT/EP2010/001877
§ 371 (c)(1),
(2), (4) Date: Sep. 14, 2012

(87) PCT Pub. No.: WO2011/116790
PCT Pub. Date: Sep. 29, 2011

(65) Prior Publication Data
US 2013/0008563 A1    Jan. 10, 2013

(51) Int. Cl.
*A01G 3/025*    (2006.01)

(52) U.S. Cl.
CPC .................. *A01G 3/0251* (2013.01)

(58) Field of Classification Search
CPC .......... A01G 3/02; A01G 3/021; A01G 3/025; A01G 3/0251; B26B 17/00–17/02
USPC ......... D8/5, 57; 30/189, 190, 250, 251, 266, 30/340, 341; 81/60–62, 63.1, 63.2, 318, 384
See application file for complete search history.

(56) References Cited

U.S. PATENT DOCUMENTS

| | | | | |
|---|---|---|---|---|
| 1,820,169 A | * | 8/1931 | Wigand | ................ B25B 7/04 30/190 |
| 3,273,240 A | | 9/1966 | Florian | |
| 3,390,455 A | * | 7/1968 | Florian | ................ B23D 29/026 30/190 |
| 3,851,389 A | * | 12/1974 | Swanson | ............. B23D 29/026 30/250 |
| 4,176,450 A | * | 12/1979 | Muromoto | ............. B26D 3/169 30/251 |
| 4,186,484 A | * | 2/1980 | Tanaka | ................. B23D 29/023 30/251 |

(Continued)

FOREIGN PATENT DOCUMENTS

AU    2010101247 A4 *  12/2010
DE       1553692 A1      5/1971

(Continued)

OTHER PUBLICATIONS

International Search Report and Written Opinion of PCT/EP2010/001877 mailed Dec. 20, 2010.

(Continued)

*Primary Examiner* — Jason Daniel Prone
(74) *Attorney, Agent, or Firm* — Nelson Mullins Riley & Scarborough LLP

(57) ABSTRACT

For hand-operated garden shears, in particular tree-pruning shears, with a ratchet mechanism, a ratchet lever may be disposed between a hand lever and a scissor lever and the ratchet lever may engage in different latching positions according to the ratchet mechanism. A rotatable abutment surface may be provided on the hand lever and a mating bearing surface on the lever extension, or vice versa, which, at the end of an initial closing operation with the ratchet lever in a first ratchet position, may allow a continuation of the cutting operation as a direct cut without further use of the ratchet mechanism.

8 Claims, 1 Drawing Sheet

(56) References Cited

U.S. PATENT DOCUMENTS

| | | | | |
|---|---|---|---|---|
| RE30,613 E * | 5/1981 | Nakamura | ............. | B26B 13/16 30/190 |
| 4,312,127 A * | 1/1982 | Tanaka | ................. | B23D 21/10 30/250 |
| 4,368,577 A * | 1/1983 | Babb | ...................... | B26B 13/26 30/251 |
| 5,511,314 A | 4/1996 | Huang | | |
| 5,718,051 A * | 2/1998 | Huang | .................. | B23D 21/10 30/250 |
| 5,761,815 A * | 6/1998 | Lin | ...................... | A01G 3/0251 30/251 |
| 5,950,314 A * | 9/1999 | Chang | ..................... | A01G 3/02 30/250 |
| D434,285 S * | 11/2000 | Podlesny | .......................... | D8/5 |
| 6,470,575 B2 | 10/2002 | Huang | | |
| 6,640,442 B2 * | 11/2003 | Lin | ...................... | A01G 3/0251 30/250 |
| 6,766,581 B2 * | 7/2004 | Nordlin | ............... | B23D 29/023 30/251 |
| 7,127,819 B1 * | 10/2006 | Huang | ................. | B23D 21/06 30/251 |
| 7,454,837 B2 * | 11/2008 | Shan | ........................ | A01G 3/02 30/251 |
| 7,743,509 B2 * | 6/2010 | Macsay | .................. | B26D 3/169 30/251 |
| 7,946,039 B2 * | 5/2011 | Erbrick | ................. | B23D 21/10 30/251 |
| 7,966,681 B2 * | 6/2011 | Harris | ...................... | B25B 7/02 30/251 |
| 8,024,864 B2 * | 9/2011 | Mortensen | .............. | B26B 17/02 30/250 |
| 8,266,804 B2 * | 9/2012 | Huang | .................... | A01G 3/02 30/190 |
| 8,458,912 B2 * | 6/2013 | Linden | .................... | A01G 3/02 30/251 |
| 8,578,614 B2 * | 11/2013 | Hernandez | ............. | B26B 13/26 30/251 |
| 8,732,960 B2 * | 5/2014 | Wang | ..................... | A01G 3/021 30/251 |
| 8,813,370 B2 * | 8/2014 | Pellenc | ................... | B26B 15/00 30/249 |
| 8,978,255 B2 * | 3/2015 | Wu | ........................ | A01G 3/0251 30/185 |
| 9,066,473 B2 * | 6/2015 | Podlesny | ................. | A01G 3/02 30/250 |
| 9,345,200 B2 * | 5/2016 | Cunningham | ....... | A01G 3/0251 30/251 |
| 2007/0044317 A1 * | 3/2007 | Critelli | ................... | B23D 29/02 30/173 |
| 2007/0079512 A1 * | 4/2007 | Nelson | ..................... | B25G 1/04 30/251 |
| 2010/0043237 A1 * | 2/2010 | Linden | ................. | A01G 3/0251 30/250 |
| 2011/0283545 A1 * | 11/2011 | Wu | .......................... | A01G 3/02 30/250 |
| 2012/0047750 A1 * | 3/2012 | Maag | ......................... | A01G 3/02 30/251 |
| 2015/0237809 A1 * | 8/2015 | Lin | ........................ | A01G 3/021 30/252 |
| 2016/0088801 A1 * | 3/2016 | Sampson | ............. | A01G 3/0251 30/251 |

FOREIGN PATENT DOCUMENTS

| | | |
|---|---|---|
| DE | 19712170 A1 | 11/1997 |
| DE | 102009019989 A1 * | 11/2010 |
| EP | 2427046 B1 * | 6/2015 |
| FR | 1511708 A | 2/1968 |
| WO | WO 2010127814 A1 * | 11/2010 |
| WO | WO 2011116790 A1 * | 9/2011 |

OTHER PUBLICATIONS

Chapter I International Preliminary Report on Patentability of PCT/EP2010/001877 mailed Sep. 25, 2012.

* cited by examiner

HAND-OPERATED SHEARS

BACKGROUND

The invention relates to hand-operated shears with a ratchet mechanism.

Shears with ratchet mechanisms have the advantage that higher resistance forces of the material to be cut can be overcome with moderate hand force of the user than with shears with the same hand lever length without a ratchet mechanism. A design is especially customary in which in a first articulation a second hand lever and in a second articulation a second shears lever are connected to a first pivot lever that contains a first shears shaft and a first hand lever. The second shears lever contains a second shears cheek and a lever extension. The lever extension is connected via a ratchet lever to the second hand lever, whereby a first end of the ratchet lever is supported in a third articulation and the second end of the ratchet lever is supported on a ratchet structure with several ratchet steps. In a first ratchet position, in which the ratchet lever engages after the maximal opening position of the hand levers during the closing of the hand levers, the shears cheeks (e.g. blades) cannot be completely closed. The hand levers must be opened a little bit wider again after reaching the end position of a first closing operation of the hand levers, whereby the ratchet lever jumps under spring action to one of the next ratchet steps, in which in the end position of the hand lever closing operation a more extensive or complete closing of the shears cheeks is possible. Shears with such a ratchet mechanism are known, e.g. from DE 298 16 971 U1.

The multiple closing operations of the hand levers with partial opening to be carried out in between them are also necessary if the resistance of the material to be cut could also be overcome in a single closing operation of the hand levers, in the following as a direct cut, by the hand force that can be applied by the user on the hand levers. In such a case the multi-step cutting operation via the ratchet mechanism is unnecessarily expensive.

The GARDENA Comfort Ratchet Shears Smart Cut has a pivotable support lever on the second handgrip, with which support lever the end of the lever extension of the second shears lever, which end faces away from the second shears axis, can be supported against the second hand lever in a ratchet mechanism of the described type without the ratchet lever with the ratchet structure becoming effective in a force-transferring manner so that a direct cut can be carried out with an expenditure of force as in traditional garden shears. For stronger material to be cut the ratchet mechanism can be engaged by pivoting the support lever away and a cut can be made in several motions.

U.S. Pat. No. 6,470,575 B2 suggests, in order to avoid the multiple actuation of ratchet shears, the construction of a control cam on the lever extension facing the second hand lever, which cam is guided on two rollers arranged on the second hand lever during the closing operation carried out as a direct cut. However, this is only an attempt to optimize the expenditure of force via the course of a cutting operation during a direct cut. One according to the same principle but with a roller on the lever extension and with a control cam on the second hand lever is described in the MD 3065 F1. A distinct reduction of the required force by a multiple closing operation of a ratchet mechanism with a greater accumulative hand lever travel is not possible with these shears with control cam.

BRIEF SUMMARY

The present invention has the task of improving the handling of garden shears with a ratchet mechanism, in particular of tree-pruning shears.

The invention is described in the independent claim. The dependent claims contain advantageous embodiments and further developments of the invention.

The invention gives the user the possibility of choosing to continue a cutting operation, begun while using an initially assumed ratchet position of the ratchet mechanism, upon reaching the end of the initial closing movement associated with this initial ratchet position either as a multi-step cutting operation typical for ratchet shears and moving the hand levers back for this into the open direction, or to continue the cutting operation, begun as a ratchet cut, as a direct cut without reversing the movement of the hand levers.

The user can therefore decide during the cutting operation, depending on the situation, whether he wants to carry out the initial cutting procedure without using the further ratchet positions as a simple direct cut or wishes to use the ratchet function. The user can make the decision spontaneously using the resistance of the material to be cut conducted in the initial cutting operation without committing himself already before the cutting operation. In particular, the user does not need to actuate any separate actuation element that brings about the shifting between two force transmission mechanisms.

In a preferred embodiment of the invention there is the possibility, building on the known ratchet mechanism, which has proven itself as regards the possible reduction of force by the abutment of the abutment surface on the mating bearing surface, which abutment occurs after an initial closing operation, with the ability to loosen the ratchet engagement by continuing the closing operation of the hand levers, to continue the cutting operation without previously opening the hand levers as an uninterrupted cutting operation up to one of the next ratchet positions or preferably as a direct cut up to the complete closing of the shears cheeks and the separation of the material to be cut. In such a continuation of the cutting operation without previous partial opening of the hand levers an expenditure of force comparable to that of garden shears without ratchet mechanism is required.

The initial cutting procedure can be carried out with relatively low force by the ratchet lever that always engaged into the first catch step after the complete opening of the hand levers. Upon the contacting of the abutment surface on the mating bearing surface the resistance of force offered to the user rises suddenly. If the expenditure of force seems too high to the user for the continuation of the closing operation he can go directly into the ratchet cutting mode without any other requirement in that he again partially opens the hand levers until the ratchet lever advances to a further ratchet step.

One of the two surfaces of the abutment surface and the mating bearing surface can, advantageously, have a convex curvature and the other surface can have a curved, concave curvature that is less in comparison to the latter, as a result of which the so-called Hertzian pressing on the quasi-punctual contacting of the two surfaces can be held low.

The surface of at least one of the two adjacent surfaces can be worked in a friction-reducing manner, in particular it can be provided with a friction-reducing coating or covering. The geometries of the abutment surface and the mating bearing surface can be shaped in such a manner that the force transmitted between the two surfaces favours the relative shifting of the two adjacent surfaces during the progressing closing operation.

It is especially advantageous to design the relative movement between the abutment surface and the mating bearing surface, that rest on one another in a shifting position during the continuation of the cutting operation of the hand levers in the direct cut mode, as a rolling of a surface on another one. To this end the abutment surface is advantageously constructed on a mechanical element that can rotate at least in a limited manner. The abutment surface is, advantageously, convexly curved away from the point of rotation and preferably designed as a circumferential surface of a rotatably supported roller. The mating bearing surface is then, advantageously, designed concavely curved away from the abutment surface, as a result of which the Hertzian pressing at the contact point of an abutment surface and mating bearing surface can advantageously be kept low.

The abutment surface can be arranged on the lever extension and the mating bearing surface on the second hand lever or vice-versa. The engagement structure can be arranged on the lever extension or on the second hand lever.

The invention is illustrated in detail in the following using preferred exemplary embodiments with reference made to the illustrations, in which

DETAILED DESCRIPTION

Figure 1:
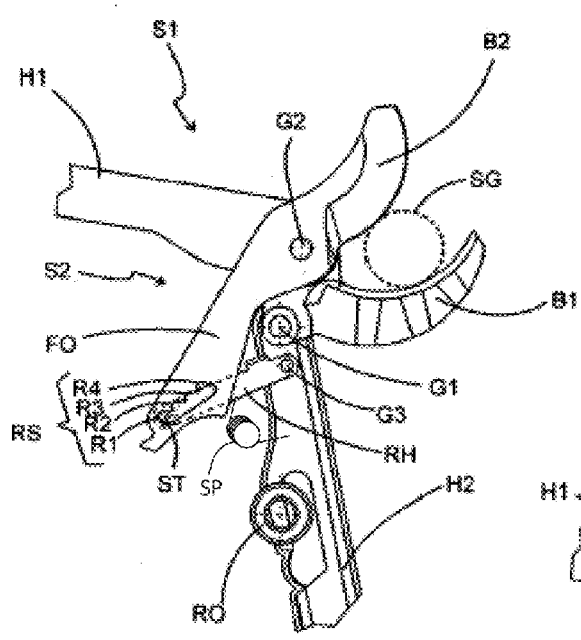
FIG. 1 shows initially wide-open shears.

FIG. 1 shows a lateral view, i.e. viewed in the axial direction of the articulations of the shears, of shears in an initial open position. The shears contain a first shears lever S1 that contains a first handgrip H1 and a first shears cheek B1, e.g. first blade. The first shears cheek B1 can also be designed in particular as the anvil of anvil shears. A first articulation point G1 and a second articulation point G2 are provided on the first shears lever.

A second hand lever H2 is connected in a first articulation at the articulation point G1 to the first shears lever. A second shears lever S2 is connected at the articulation point G2 in a second articulation to the first shears lever S1. The second shears lever S2 contains a second shears cheek B2, e.g. second blade, and a lever extension FO facing away from the latter relative to the second articulation point G2. In a third articulation point G3 a ratchet lever RH is articulated with a first end to the second hand lever H2. On the opposite second end of the ratchet lever RH the ratchet lever RH is supported via an engagement element, for example, a pin ST, on a catch structure RS comprising several catch steps R1, R2, R3, R4.

The catch structure RS is constructed in a customary design as an opening through a plate forming the second shears lever S2. The ratchet lever RH is pressed in the direction of the catch steps R1, R2, R3, R4 of the catch structure RS, thus, clockwise in FIG. 1, by a spring SP that can be, for example, a traction spring to the first hand lever H1 or a leg spring supported on the second hand lever H2.

In the position of the shears with wide-open shears mouth between the shears cheeks B1 and B2 shown in FIG. 1, the pin ST lies as engagement element of the ratchet lever RH in the first catch step R1 of the catch structure RS. The geometry of the quadrilateral consisting of the first articulation point G1, second articulation point G2, pin ST, and third articulation point G3 is decisive for the transfer of force of a user for moving the two hand levers H1 and H2 onto one another into a cutting force on a material to be cut SG between the shears cheeks B1 and B2. The degree of the transfer of force can be influenced by the geometry of the lengths of the sides of this quadrilateral. In the case of a pin ST resting in another catch step R1, R2, R3, R4 the geometry of the quadrilateral and therefore the degree of the transfer of force are changed.

If the hand levers H1 and H2 are moved toward one another by a force of a user, in particular a user force acting on the second hand lever H2 is transferred via the ratchet lever RH, which is loaded by pressure, into the first catch step R1, e.g. groove, of the catch structure RS and is converted into a torque of the second shears lever S1 about the second articulation point G2. The material to be cut SG is supported at this time on the first shears cheek B1 taken to be the shears anvil and the polished second shears cheek B2 cuts into the material to be cut. The closing operation can be continued during the transfer of force via the ratchet lever RH into the first catch step R1 to the position shown in FIG. 2 in which the second shears cheek B2 has penetrated into the material to be cut SG and has separated it, but only partially. The lever extension FO lies in this position of the shears with a mating bearing surface GF on an abutment surface AF that is given by the circumferential surface of a roller RO rotatably supported on the second hand lever H2.

Typically, in known ratchet shears with such a construction when a mating bearing surface GF of the lever extension FO is placed on an abutment surface AF of the second hand lever H2, the closing movement of the hand levers H1, H2 moved onto one another is reversed and the hand levers H1, H2 are pivoted away from one another again, which is designated as the opening or the opening direction of the hand levers H1, H2. If the second hand lever H2 is pivoted away again from the first hand lever H1 out of the position sketched in FIG. 2 when the first shears cheek B1 remains placed on the material to be cut SG, the second shears lever S2 remains standing on account of the second shears cheek B2 that has already penetrated into the material to be cut SG, and the second end of the ratchet lever RH moves with the pin ST inside the catch structure RS further to the next or in general to one of the next catch steps R1, R2, R3, R4 and engages under the action of the spring force, that acts clockwise in a rotary manner on the ratchet lever RH, into a catch step R1, R2, R3, R4 located nearer to the second articulation point G2.

Upon another movement of the two hand levers H1, H2 toward one another under the action of a user force, the ratchet lever RH is now supported on a catch step R1, R2, R3, R4 closer to the second articulation point G2 and the second shears cheek B1 presses further into the material to be cut SG until the lever extension FO again rests with the mating bearing surface GF on the abutment surface AF of the roller RO or until the material to be cut SG has been entirely separated, which is always given when the ratchet lever RH is supported by the pin ST in the catch step R1, R2, R3, R4 that is the closest to the second articulation point G2.

Figure 2:
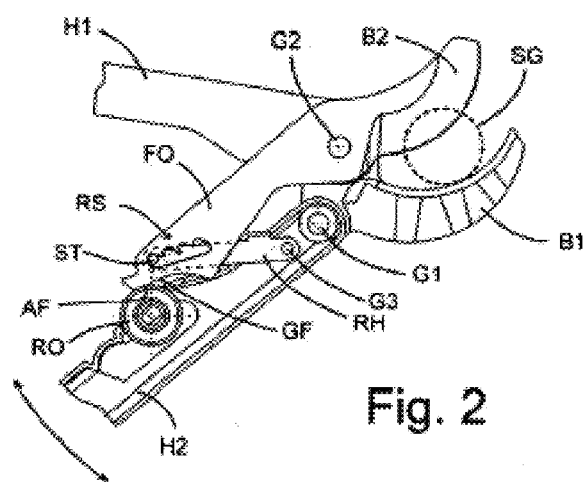
FIG. 2 shows the shears at the end of the initial closing operation.
Figure 3:
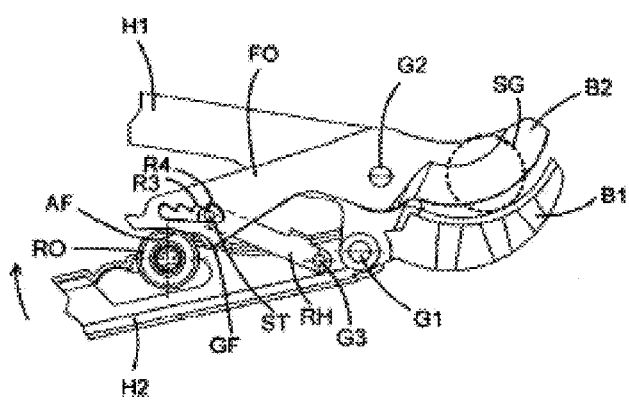
FIG. 3 shows the shears in a more advanced cutting stage.

The invention now provides that starting from the situation according to FIG. 2 the direction of movement of the hand lever H1, H2 is not reversed in the direction of opening, but rather the closing procedure of the hand levers H1, H2 moving the two hand levers H1, H2 toward one another is continued in the same direction of movement. A transfer of force from the second hand lever H2 onto the lever extension FO no longer takes place here via the ratchet lever RH between the third articulation point G3 and the catch structure RS, but rather via the support of the roller RO, its abutment surface AF and the mating bearing surface GF on the lever extension FO. As a result of this transfer of force path another geometry of force transfer is given for the continuation of the closing procedure of the hand levers H1, H2 and, associated with it, also for the continuation of the closing movement of the shears mouth between the two shears cheeks B1, B2, which geometry corresponds substantially to the transfer of force in garden shears without a ratchet mechanism. The force to be exerted by the user on the hand levers H1, H2 therefore rises suddenly. If the user now applies the required greater force, that is assumed to be substantially equal to the force required for garden shears without a ratchet mechanism, the second hand lever H2 and the lever extension FO of the second shears lever are pivoted substantially uniformly to one another onto the first hand lever H1 and the shears mouth is completely closed up to the separation of the material to be cut SG. During this time the pin ST of the ratchet lever RH travels inside the ratchet structure, e.g. catch structure RS, along the several catch steps R1, R2, R3, R4 but without fulfilling a function inside the ratchet mechanism and in particular without transferring the user's force onto the shears levers S1, S2. FIG. 3 shows the shears in a more advanced closing state, in which the pin ST passes over the cog separating the next-to-the-last catch step R3 from the last catch step R4.

If the user wants to continue the closing procedure as a direct cut in the situation according to FIG. 2 but determines that he cannot apply the force required for this, he can simply pivot the two hand levers away from one another again without actuating any mechanical element in the procedure customary for the ratchet mechanism until the pin ST of the ratchet lever engages into one of the next catch steps R1, R2, R3, R4 and then continue the cutting procedure with a force that is less in comparison to the direct cut, optionally even in several further steps. The user can also initially make more than one step of the multi-step ratchet cutting procedure with an opening motion between two closing motions as ratchet cut and only then move into a direct cut.

As is known about ratchet shears, the catch structure RS can also be constructed on the sides of the second hand lever H2 and the ratchet lever RH can be articulated in a fixed position at a third articulation point on the lever extension FO and engage with an engagement element such as, for example, the pin ST into the catch structure RS on the hand lever H2.

Abutment surface AF and mating bearing surface GF can also be exchanged in such a manner that the abutment surface is constructed on the lever extension FO and the mating bearing surface GF on the sides of the hand lever H1, H2, for which the roller RO or another element that can rotate at least in a limited manner and carries the abutment surface AF is rotatably fastened on the lever extension FO.

The abutment surface AF, that rolls off on the mating bearing surface GF during the continuation of the cutting procedure as direct cut, can also be constructed only over a limited angular range about the point of rotation of a rotatable abutment element and can also deviate from the form of an exact circular arc about the point of rotation. An abutment element with limited rotation is advantageously pressed spring-loaded into a defined start position.

The previous features and those indicated in the claims and those that can be gathered from the figures can be advantageously realized individually as well as in various combinations. The invention is not limited to the described exemplary embodiments but can be modified in the framework of professional ability in many ways.

The invention claimed is:

1. Hand-actuated garden shears comprising:
    a first shears lever comprising a first shears cheek and a first hand lever;
    a second hand lever connected at a first articulation point to the first hand lever;
    a second shears lever comprising a second shears cheek and a lever extension, wherein the second shears cheek is connected at a second articulation point to the first hand lever, wherein the second shears cheek and the lever extension are disposed between the first and the second hand levers, and wherein the lever extension faces away from the first shears cheek relative to the second articulation point;
    a ratchet lever connecting the lever extension and the second hand lever, wherein the ratchet lever is connected to the second hand lever and to the lever extension by a first end at a third articulation and by a second end in a multi-step catch structure and is enabled to be shifted under spring-loading between different catch positions with engagement into different catch steps of the catch structure around the third articulation, wherein different catch steps are associated with different maximal and minimal opening widths of first and second hand levers and first and second shears cheeks,
    wherein a first closing procedure is enabled comprising, starting with the first and second shears cheeks in an initially open position, moving the first and second hand levers in several steps with an alternating closing movement and an opening movement of the first and second hand levers as the ratchet lever shifts between the different catch positions, and
    wherein carrying out of a complete cutting procedure with only one closing movement of the hand levers as a direct cut-is enabled, starting from an open position of the first and second hand levers, by transferring force from the first and second hand levers to the first and second shears cheeks in an initial catch step of the different catch steps, and wherein upon reaching an end of the closing movement of the first and second hand levers, which is associated with the initial catch step, contact of a surface of the lever extension against a surface on the second hand lever allows a continuation of the closing movement of the first and second hand levers for a continuation of the cutting procedure as a direct cut as well as enabling a continuation of the cutting process after an opening movement of the hand levers upon another closing movement via a second catch step of the different catch steps.

2. The shears according to claim 1, wherein a direct cut is possible from each catch step of the different catch steps up to the complete closing of the first and second shears cheeks in a continuous closing movement of the first and second hand levers.

3. The shears according to claim 1, wherein upon maximal opening width of the first and second hand levers the ratchet lever rests in the catch structure in the first catch step in which the first and second shears cheeks cannot completely close, and when the ratchet lever rests in the first catch step a closing of the hand levers brings about a contacting of the surface of the lever extension comprising an abutment surface against the surface on the second hand lever comprising a mating bearing surface, wherein a closing movement of the first and second hand levers continued under the force of a user initiates the loosening of the second end of the ratchet lever out of a previously assumed catch step, and during the continued closing movement of the first and second hand levers the abutment surface and mating bearing surface transfer the force of the user onto the second shears lever.

4. The shears according to one claim 3, wherein the abutment surface or the mating bearing surface are provided with a surface coating.

5. The shears according to claim 3, wherein the abutment surface runs in a convexly curved manner.

6. The shears according to claim 5, wherein the mating bearing surface runs in a concavely curved manner.

7. The shears according to claim 3, wherein the abutment surface is constructed on a bearing element that is enabled to rotate at least in a limited manner.

8. The shears according to claim 7, wherein the abutment surface is a circumferential surface of a rotatably supported roller.

\* \* \* \* \*